(12) United States Patent
Shih

(10) Patent No.: US 6,583,586 B1
(45) Date of Patent: Jun. 24, 2003

(54) BRIGHTNESS- REGULATING VOLTAGE-TRANSFORMING CIRCUIT FOR HIGH-PRESSURE DISCHARGE LAMP

(75) Inventor: Wen-Chu Shih, Taipei (TW)

(73) Assignee: Hwa Youn Co., Ltd., Taipei (TW)

( * ) Notice: Subject to any disclaimer, the term of this patent is extended or adjusted under 35 U.S.C. 154(b) by 0 days.

(21) Appl. No.: 10/147,027

(22) Filed: May 15, 2002

(51) Int. Cl.$^7$ ............................................... G05F 1/00
(52) U.S. Cl. ..................... 315/291; 315/219; 315/225; 315/206; 315/283; 315/290; 315/DIG. 4; 315/DIG. 7
(58) Field of Search .................. 315/206, 219, 315/223, 225, 254, 283, 224, 291, 307, 209 R, DIG. 4, DIG. 7, 289, 290, 226

(56) References Cited

U.S. PATENT DOCUMENTS

| | | | | |
|---|---|---|---|---|
| 3,921,005 A | * | 11/1975 | Watrous | 307/64 |
| 4,204,148 A | * | 5/1980 | Gaertner | 323/238 |
| 4,398,130 A | * | 8/1983 | McFadyen et al. | 315/226 |
| 4,808,886 A | * | 2/1989 | Lathom et al. | 315/227 R |

\* cited by examiner

*Primary Examiner*—Haissa Philogene
(74) *Attorney, Agent, or Firm*—Pro-Techotr Inter-National Services

(57) ABSTRACT

A brightness-regulating voltage-transforming circuit includes a pulse-width modulator (PWM); a transformer connected at a secondary side to a high-pressure discharge lamp; a voltage-transforming circuit having two transistors connected at bases to outputs of the PWM for the latter to control working frequencies thereof; and a brightness control circuit including a transistor connected at a collector to a middle tap of the transformer and at a base to the PWM for the PWM to control the lamp brightness, and a diode connected at an end to a juncture of a primary side of the transformer and an end of a buffer inductance, and at another end to a voltage source. When the transistor of the brightness control circuit is cut out, energy stored in the buffer inductance is regenerated and sent to the voltage source via the diode, enabling the lamp to have reduced noise interference and increased working efficiency.

1 Claim, 2 Drawing Sheets

BRIGHTNESS-REGULATING VOLTAGE-TRANSFORMING CIRCUIT FOR HIGH-PRESSURE DISCHARGE LAMP

BACKGROUND OF THE INVENTION

The present invention relates to a brightness-regulating voltage-transforming circuit for high-pressure discharge lamp that provides better performance as compared with conventional circuits designed for the same purpose.

FIG. 1 is a circuit diagram of a conventional brightness-regulating voltage-transforming circuit for high-pressure discharge lamp previously designed by the same applicant of the present invention. As shown, the circuit mainly includes a voltage-transforming circuit consisting of a primary coil of a transformer T1, a first transistor Q2, a second transistor Q3, a first feedback resistance R10, a second feedback resistance R11, and a buffer inductance L1; and a brightness control circuit consisting of a transistor Q1, a buffer inductance L1, a diode D1, and other relevant resistors. The buffer inductance L1 for the brightness control circuit is the same one buffer inductance L1 included in the voltage-transforming circuit. That is, the brightness control circuit and the voltage-transforming circuit use the same one buffer inductance L1. When the transistor Q1 is made, current passes through the buffer inductance L1, and a part of energy accumulates on the buffer inductance L1. When the transistor Q1 is cut out, energy accumulated on the buffer inductance L1 is released to produce high temperature and noise interference that has adverse influences on the high-pressure discharge lamp.

It is therefore desirable to develop an improved brightness-regulating voltage-transforming circuit for high-pressure discharge lamp to eliminate drawbacks existing in the conventional circuit designed for the same purpose.

SUMMARY OF THE INVENTION

A primary object of the present invention is to provide a brightness-regulating voltage-transforming circuit for high-pressure discharge lamp that is able to reduce noise interference with the high-pressure discharge lamp and to increase the working efficiency thereof.

To achieve the above and other objects, the brightness-regulating voltage-transforming circuit for high-pressure discharge lamp of the present invention incorporates a diode into a brightness control circuit thereof. The diode is connected at an end to a juncture of a primary side of a transformer and an end of a buffer inductance, and at another end to a voltage source. When a transistor in the brightness control circuit is cut out, energy stored in the buffer inductance is regenerated and sent to the voltage source via the diode. As a result, the high-pressure discharge lamp has reduced noise interference and increased working efficiency.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
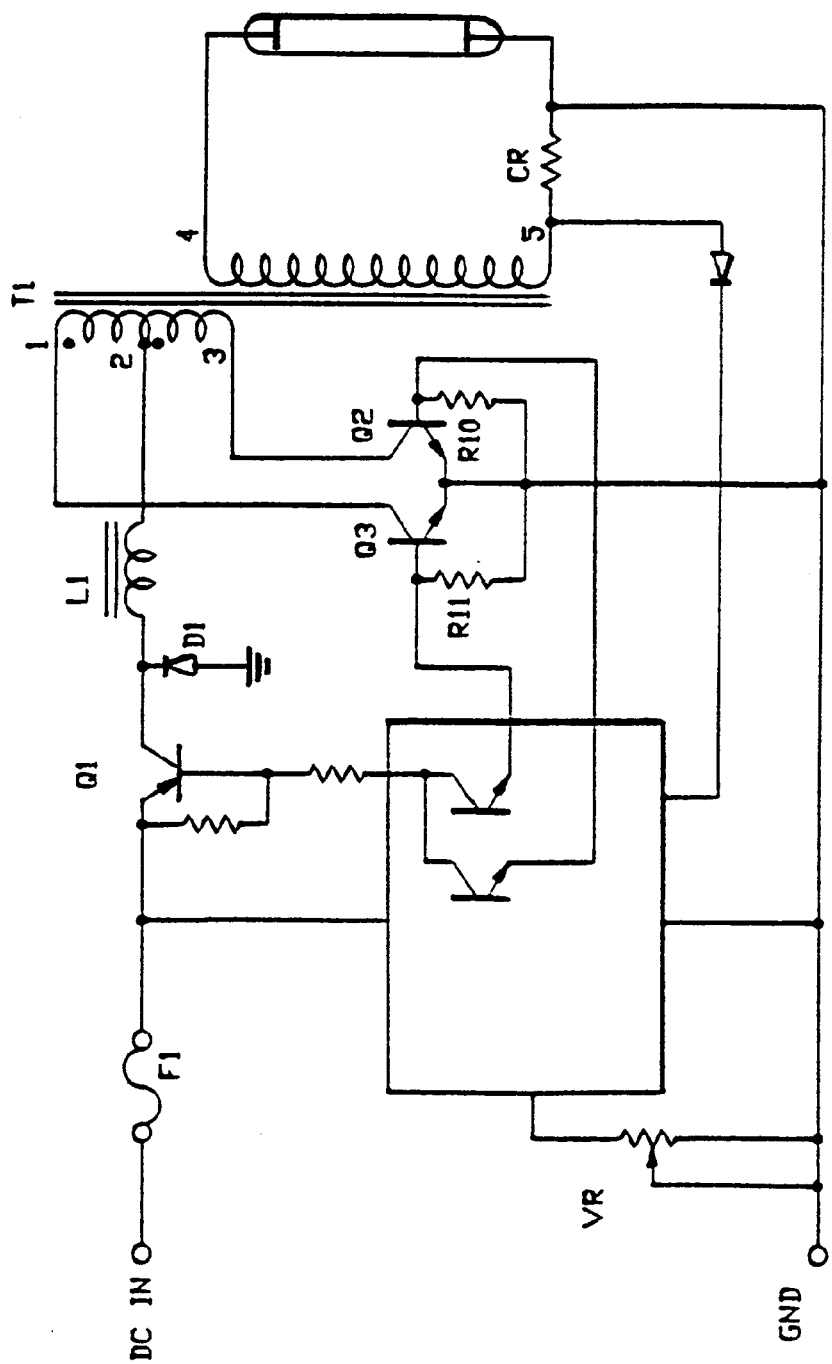
FIG. 1 is a circuit diagram of a conventional brightness-regulating voltage-transforming circuit for high-pressure discharge lamp.
Figure 2:
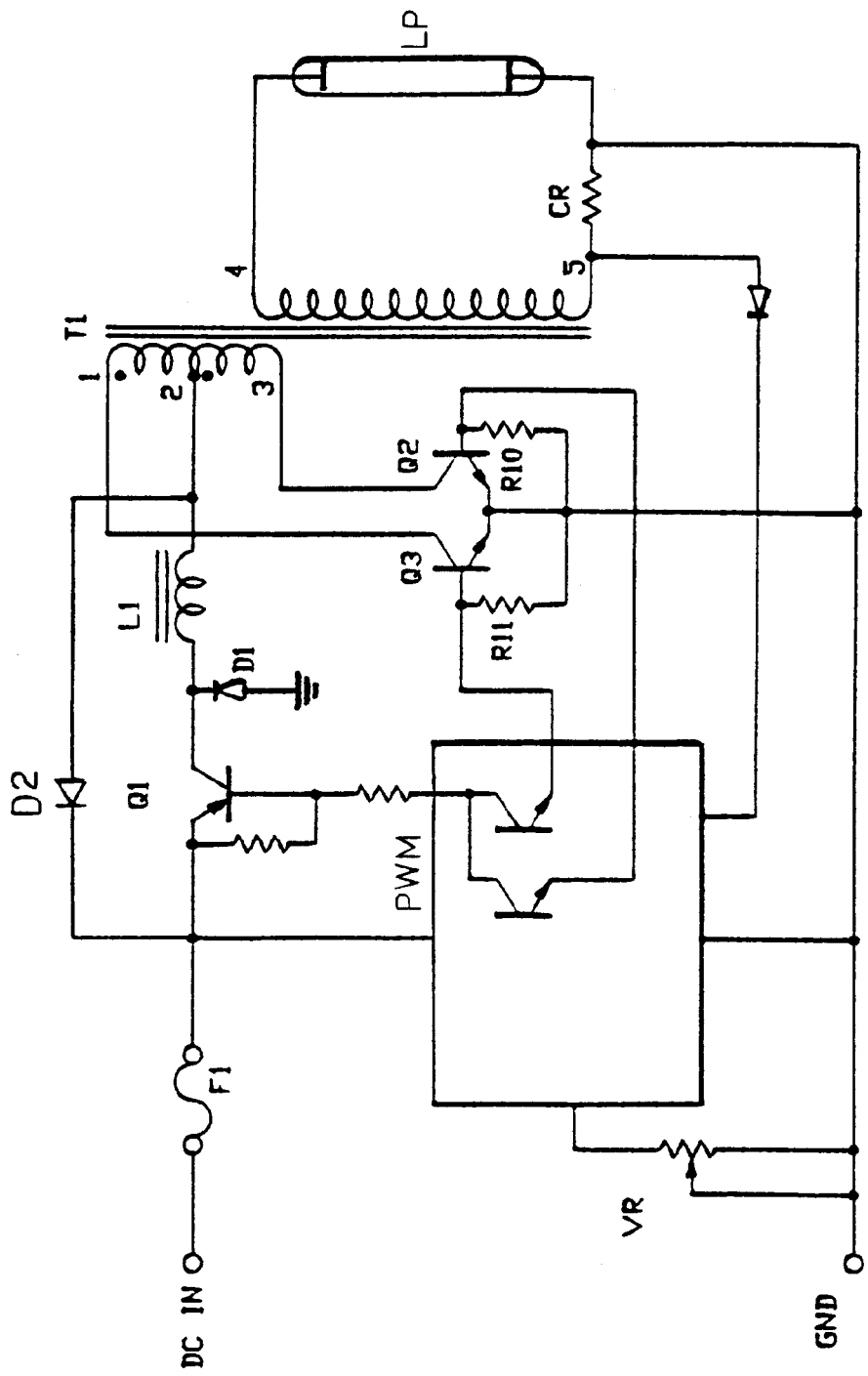
FIG. 2 is a circuit diagram of a brightness-regulating voltage-transforming circuit for high-pressure discharge lamp according to the present invention.

Please refer to FIG. 2 that is a circuit diagram of a brightness-regulating voltage-transforming circuit for high-pressure discharge lamp according to the present invention. As shown, the circuit mainly includes:

a voltage-transforming circuit consisting of a transformer T1, a first transistor Q2, a second transistor Q3, a first feedback resistance R10, a second feedback resistance R11, and a buffer inductance L1;

a brightness control circuit consisting of a transistor Q1, the buffer inductance L1, a first diode D1, a second diode D2, and other relevant resistors. It is noted the brightness control circuit and the voltage-transforming circuit use the same one buffer inductance L1;

a pulse-width modulator PWM for controlling a magnitude of electric power at a fixed frequency based on a make-break ratio of each cycle;

a transformer T1 being connected at two outer ends, namely, a first and a third pin, of a primary side thereof to collectors of the first and the second transistor Q2, Q3, and at a middle tap, namely, a second pin, of the primary side to a juncture of the buffer inductance L1 and an end of the second diode D2; one output of the transformer T1, namely, a fourth pin thereof, is directly connected to an end of a lamp LP, and another output of the transformer T1, namely, a fifth pin thereof, is connected to the other end of the lamp LP via a feedback resistance CR; and a fuse F1 for inputting direct current from a power source DC IN to the circuit of the present invention.

It is noted the first and the second transistor Q2, Q3 in the voltage-transforming circuit are connected at their collectors to two ends of the primary side of the transformer T1, and at their bases to transistor outputs of the pulse-width modulator PWM, so that the pulse-width modulator PWM directly drives the transistors Q2, Q3, and the transistors Q2, Q3 have working frequencies controlled by the pulse-width modulator PWM without being affected by a transformer resonance.

In the brightness control circuit, the transistor Q1 has a base controlled by the pulse-width modulator PWM, and a collector serving as an output and being connected to the middle tap (namely, the second pin) of the transformer T1 via the buffer inductance L1, so that the pulse-width modulator PWM directly controls the brightness of the high-pressure discharge lamp. The present invention is characterized in the second diode D2 included in the brightness control circuit. The diode D2 has an end connected to the juncture of the primary side of the transformer T1 and an end of the buffer inductance L1, and another end connected to the voltage source DC IN. When the transistor Q1 is cut out, energy stored in the buffer inductance L1 is regenerated and sent to the voltage source DC IN via the diode D2. With the regeneration of the energy accumulated in the buffer inductance L1, the high-pressure discharge lamp is less interfered by noises and therefore has enhanced working efficiency. The secondary side of the transformer T1 is directly connected to the lamp LP to provide sufficient starting voltage to lighten the lamp without the need of a current-limiting capacitance.

Since the pulse-width modulator PWM directly drives the transistors Q1, Q2, and Q3, it not only controls the brightness of the lamp LP, but also controls the working frequencies of the transistors Q2, Q3 to protect them from being affected by the resonance of the transformer T1. Since the pulse-width modulator PWM serves to control the working frequencies of the transistors and no transformer resonance is needed in a process of power conversion, there is only very low energy stored in the transformer T1. As a result, upgraded power conversion efficiency can obtained, and less magnetically conductive material is required in the circuit. Moreover, since the lamp has a starting voltage that is three times of the working voltage thereof at 0° C., no current-limiting capacitance is needed for the output of the transformer T1 to the lamp LP. When the transistor Q1 is cut out, energy stored in the buffer inductance L1 can be regenerated and sent to the power source DC IN via the second diode D2. Reduced noise interference and increased working efficiency could therefore be obtained for the lamp LP. The pulse-width modulator PWM also includes an adjustable resistor VR for regulating the brightness of the lamp LP.

With the above-described arrangements, the present invention provides an improved brightness-regulating voltage-transforming circuit for high-pressure discharge lamp, in which energy stored in the buffer inductance thereof can be regenerated and sent to the power source via an additionally provided diode when the transistor in the brightness control circuit is cut out. The present invention therefore enables not only reduced noise interference but also enhanced energy utilization in the high-pressure discharge lamp.

What is claimed is:

1. A brightness-regulating voltage-transforming circuit for high-pressure discharge lamp, comprising a voltage-transforming circuit including a first transistor and a second transistor, a brightness control circuit including at least one transistor and a buffer inductance, a pulse-width modulator, and a transformer;

said transistor in said brightness control circuit having a base being controlled by said pulse-width modulator, and a collector serving as an output and connected to a middle tap of said transformer, so that said pulse-width modulator is adapted to control the brightness of said high-pressure discharge lamp;

said first and said second transistor in said voltage-transforming circuit having collectors separately connected to two ends of a primary side of said transformer, and bases directly connected to outputs of said pulse-width modulator, so that said pulse-width modulator is adapted to directly drive said first and said second transistor, and working frequencies of said two transistor are controlled by said pulse-width modulator without being affected by a transformer resonance;

said transformer having a secondary side directly connected to an end of at least one said high-pressure discharge lamp to start said lamp without using any current-limiting capacitance; and said brightness-regulating voltage-transforming circuit for high-pressure discharge lamp being characterized in a diode provided in said brightness control circuit, said diode being connected at an end to a juncture of said primary side of said transformer and an end of said buffer inductance, and at another end to a voltage source;

whereby when said transistor in said brightness control circuit is cut out, energy stored in said buffer inductance is regenerated and sent to said voltage source via said diode in said brightness control circuit.

* * * * *